(12) United States Patent
Giampavolo

(10) Patent No.: US 7,722,058 B2
(45) Date of Patent: May 25, 2010

(54) CHILD SUPPORT CARRIER ATTACHABLE TO A SHOPPING CART

(76) Inventor: Paul Giampavolo, 6 Kingsbrige Rd., Fairfield, NJ (US) 07004

( * ) Notice: Subject to any disclaimer, the term of this patent is extended or adjusted under 35 U.S.C. 154(b) by 253 days.

(21) Appl. No.: 11/532,574

(22) Filed: Sep. 18, 2006

(65) Prior Publication Data
US 2007/0114764 A1    May 24, 2007

Related U.S. Application Data

(63) Continuation-in-part of application No. 11/059,614, filed on Feb. 15, 2005, now abandoned.

(60) Provisional application No. 60/717,692, filed on Sep. 16, 2005.

(51) Int. Cl.
*B62D 39/00* (2006.01)

(52) U.S. Cl. .............................. 280/33.991; 280/411.1; 280/47.38

(58) Field of Classification Search .......... 280/33.991, 280/33.992, 33.993, 47.23, 47.35, 47.38, 280/642, 647, 643, 650, 658, 204, 411.1, 280/410; 403/388, 4; 297/256.17
See application file for complete search history.

(56) References Cited

U.S. PATENT DOCUMENTS

| | | | | |
|---|---|---|---|---|
| 2,453,631 A | * | 11/1948 | Leser et al. .............. | 280/47.35 |
| 2,586,495 A | * | 2/1952 | Woods .................... | 280/47.35 |
| 3,524,512 A | * | 8/1970 | Barnowsky et al. .... | 280/33.991 |
| 4,305,601 A | * | 12/1981 | Berge ....................... | 403/388 |
| 4,484,755 A | * | 11/1984 | Houston ................. | 280/33.992 |
| 5,330,210 A | | 7/1994 | Lambrecht .............. | 280/33.993 |
| D357,105 S | | 4/1995 | Reiland et al ................ | D34/27 |
| 5,823,548 A | | 10/1998 | Reiland et al. ......... | 280/33.993 |
| 5,882,021 A | | 3/1999 | Reiland et al. ......... | 280/33.993 |
| 6,022,031 A | | 2/2000 | Reiland et al. ......... | 280/33.993 |
| 6,155,592 A | * | 12/2000 | Hsia ......................... | 280/642 |
| 6,237,924 B1 | | 5/2001 | Reiland et al. ......... | 280/33.993 |
| 6,270,093 B1 | | 8/2001 | Johnson et al. ........ | 280/33.993 |
| 6,312,003 B1 | * | 11/2001 | Liu ........................... | 280/411.1 |
| 6,364,326 B1 | | 4/2002 | Reiland et al. ......... | 280/33.993 |
| D461,612 S | | 8/2002 | Lobban et al ................ | D34/12 |
| 6,464,238 B2 | | 10/2002 | Reiland et al. ......... | 280/33.993 |
| 6,513,817 B2 | | 2/2003 | McCue et al. .............. | 280/79.2 |
| 6,561,526 B1 | * | 5/2003 | Towns ...................... | 280/47.38 |
| 6,572,122 B2 | | 6/2003 | Johnson et al. ........ | 280/33.993 |
| 6,575,480 B2 | * | 6/2003 | McKelvey ............. | 280/33.993 |
| 7,073,800 B2 | | 7/2006 | Shaw et al. ............ | 280/33.991 |
| 7,093,841 B2 | * | 8/2006 | Conrad .................. | 280/33.993 |
| 7,226,059 B1 | * | 6/2007 | Samuels ................. | 280/33.992 |
| 2003/0184032 A1 | | 10/2003 | Otterlee et al. ......... | 280/33.993 |
| 2004/0164507 A1 | | 8/2004 | Otterlee et al. ......... | 280/33.993 |
| 2004/0164508 A1 | | 8/2004 | Otterlee et al. ......... | 280/33.993 |
| 2005/0017469 A1 | * | 1/2005 | Hill et al. ................. | 280/47.38 |

* cited by examiner

*Primary Examiner*—Hau V Phan
(74) *Attorney, Agent, or Firm*—Ostrolenk Faber LLP

(57) ABSTRACT

A child support carrier for detachable connection to a shopping cart, the child support carrier comprising a body having a space thereon for supporting a child; a plurality of wheels on the body for stably supporting the body for rolling movement on the ground; the body having an attachment mechanism for detachably coupling to a frame of a shopping cart to allow movement of the child support carrier and shopping cart as a unit, the child support carrier being capable of use independently of the shopping cart when not attached to the shopping cart.

14 Claims, 14 Drawing Sheets

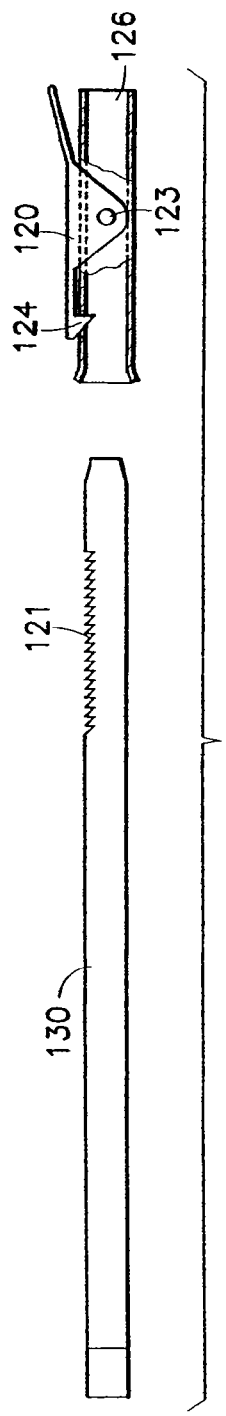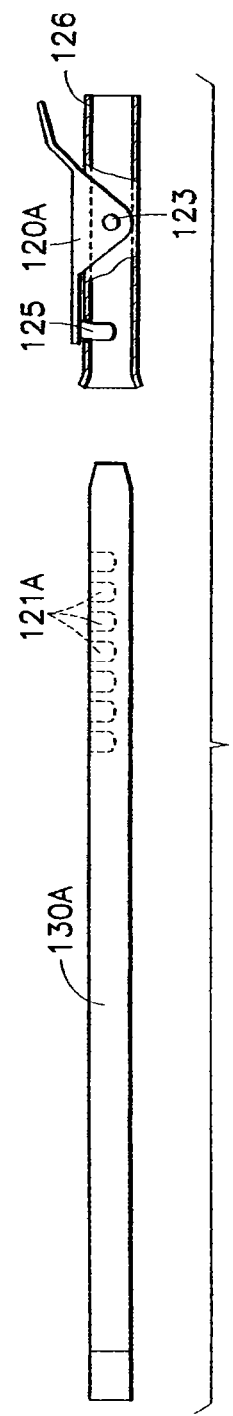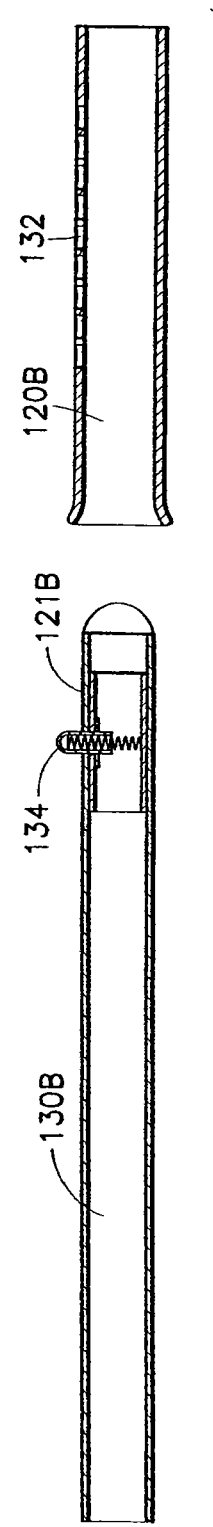

CHILD SUPPORT CARRIER ATTACHABLE TO A SHOPPING CART

CROSS REFERENCE TO RELATED APPLICATIONS

The present application claims benefit and priority of U.S. provisional patent application Ser. No. 60/717,692 filed Sep. 16, 2005 entitled Child Support Carrier Attachable to a Shopping Cart, which is hereby incorporated by reference in its entirety, and further is a continuation-in-part of non-provisional application Ser. No. 11/059,614 entitled Child Support For Attachment To Shopping Cart, filed Feb. 15, 2005, now abandoned which is also hereby incorporated by reference in its entirety, and which in turn is based on and claims benefit and priority of Provisional Application No. 60/546,037 filed Feb. 18, 2004, the entire disclosure of which is hereby incorporated by reference.

BACKGROUND OF THE INVENTION

1. Field of Invention

The present invention concerns child support and securement devices, and in particular, a device for securing, transporting, supporting and protecting children while also accommodating personal baskets and/or bulk items and/or attaching to a conventional shopping cart or a hand basket carrier type shopping cart for carrying items such as groceries or other items in retail establishments. By personal baskets is meant both baskets supplied by retailers while shopping in their stores and baskets consumers may bring in with them. By "conventional shopping cart" is meant the types of metal wire or plastic carts with the baskets permanently affixed to the cart. By "hand basket carrier shopping carts" are meant the types of shopping carts that have fixtures on frames for removably receiving portable hand baskets. These generally do not have a seating area for children whereas the conventional permanent basket shopping carts generally have a fold-down child seat near the handle of the cart.

2. Description of Related Art

Carts, such as conventional shopping carts for storing, conveying or transporting groceries or other products are known in the art to comprise a basket rigidly connected to a frame supported by two front swivel caster wheels and two rear caster wheels and the frame forms a handle at an upper, rear extremity of the cart. Conventional shopping carts usually have a collapsible child seat near the handle of the cart, suitable for only a single child and often inadequately designed for a child weighing more than 35 pounds. Placement of children in these conventional seats alters the center of gravity of the cart, thereby making the carts, especially with an empty basket, susceptible to tipping. Injuries resulting from use of these existing child seats are well documented and known in the art. (See U.S. Pat. No. 6,364,326 B1 to Reiland et al., cols. 1 and 2; see also, Consumer Product Safety Alert from the U.S. Consumer Product Safety Commissioner, March 1990, which are both hereby incorporated by reference). As a result of the documented shortcomings of the conventional cart there have been various attempts at creating child support attachments and/or redesigning the conventional carts without the level of success that will be evident in the present invention.

In various U.S. patents to Reiland, et al. (U.S. Pat. Nos. 6,364,326, which is a continuation of U.S. Pat. No. 6,022,031, which is a continuation of U.S. Pat. No. 5,882,021, which is a continuation of U.S. Pat. No. 5,823,548, which is now abandoned; and Des. Pat. No. D357,105) several attempts were made to find an "economically viable solution to child injuries needs while utilizing the existing inventory of carts, without significantly reducing the overall functionality of the carts." The "child carrier" of these designs includes a platform supported by at least one caster, at least one seat area, and a restraining device for each seat, such as a seat belt, to hold the child in place. The carrier is rigidly attached to the rear portion of the cart. However, these designs have their flaws to which the present invention turns its attention. While in the Reiland child seat, children are in proximate range of the upper rear extremity of the cart basket and are not necessarily facing away from the basket, therefore, they have visual and potentially physical access to items placed in the rear and upper portions of the cart. Furthermore, these carriers are not stackable or nestable along a horizontal axis, making them difficult for shopkeepers to store or retrieve from the store and/or parking lot after use. These designs fail to address the advantages associated with a nestable attachment, specifically, a shopkeeper can move several carriers in unison by interlocking them together along their horizontal axis. Also, these carriers are rigidly attached to the cart with a nut and bolt arrangement making the cart and child carrier accessory an integral unit and therefore are not easily removable from one another. This requires a shopkeeper to designate a certain number of an inventory of conventional carts to use as integrated child carriers. These carts are then not nestable and are undesirable to shoppers not accompanied by small children.

U.S. Pat. No. 6,464,238 to Reiland et al. depicts a passenger carrier attached to a cart in the form of a nesting, attachable apparatus having a seat that includes an upper portion in a first position that can be displaced to a second position to form an opening sized to receive a front portion of another cart basket in a nested configuration. This device also seats a child in proximate range of the upper rear extremity of the cart basket and thus is not necessarily facing away from the basket. Therefore, the child has visual and potentially physical access to items placed in the rear and upper portions of the cart. A more significant shortcoming of this design is that substantial space between the cart and the attachment apparatus is required to accommodate the displacement of the upper portion from the first to the second position when nesting. This additional length associated with this attachment significantly reduces the functionality of a cart because it places the cart basket out of a user's arms reach when pushing the cart from the rear handle. Thus, in order to select items and place them in the cart basket, one must walk away from the cart and the child in the attached seat, obtain an item, walk to the basket, deposit the item and then return to the rear again in order to push the cart. Furthermore, the apparatus is bolted to the cart creating an apparatus that is not easily detachable carrying the same disadvantages as discussed above. Also, the attachment lacks entertainment value to children.

Other attempts at modifying the child seat accommodations of conventional shopping carts have resulted in complete redesigns and abandonment of the conventional shopping cart. One such prior apparatus is depicted in U.S. Pat. No. 6,237,924 to Reiland et al. which shows a compete redesign of the size, dimensions and configuration of the cart's basket to incorporate child seating within the center basket area as opposed to the conventionally oriented rear seating. While this cart is nestable, it fails to meet the child seating needs for shopping centers having an inventory of conventionally designed carts because these devices require replacement of existing, conventional carts to obtain the benefits of their child seating capabilities.

For at least the same reason, U.S. Pat. No. 5,330,210 to Lamnberecht fails to meet the child seating needs for shopping centers because it shows an attachable cart shell designed to accommodate only a particular cart design and not the standard, conventional shopping cart. The cart has a shallow basket supported by an upper frame and a large gap between the upper frame and a lower frame sized to accommodate a child's torso and head. The shell is slid over the lower frame and rests completely thereon underneath the basket. The shell includes a seat for locating a child directly below the upper basket of the cart and may be shaped as a race car or other such entertaining shape. This design is not adaptable to the conventional cart design because there is not enough room to safely place a child underneath the basket on a conventional cart. Therefore, in order to adopt the Lamnberecht design, a shopkeeper must abandon the use of conventional carts for a modified cart that is atypical of carts typically used in grocery stores.

Another apparatus having entertainment value for children also resulted in a redesigned cart. In U.S. Pat. No. 6,513,817 to McCue et al the disclosed apparatus is a redesigned shopping cart having a child supporting apparatus and storage compartment. The device described incorporates a shopping basket in a supporting structure, for example, shaped like an automobile, and thereby is a complete redesign of a shopping cart and is not adaptable to conventional shopping carts.

U.S. Pat. No. 7,073,800 to Shaw shows a child carrier supported on the front of a conventional shopping cart that is suspended from the front of the cart. Although Shaw does show a support wheel in one embodiment, the gist of this patent is that the child support is suspended above the ground by attachment to the cart. This can result in potential instability.

SUMMARY OF THE INVENTION

There exists in the art a need for a child support carrier that easily attaches to and detaches from a shopping-cart or hand basket carrier shopping cart for securing, transporting, supporting and protecting one or more children without having to redesign the shopping-cart and without significantly reducing the functionality of the shopping cart because it does not require permanent installation or the need to tie up the shopping cart with the child support permanently affixed. Furthermore, the support attachment should be capable of accommodating one or more personal baskets for placement of items such as groceries therein. Even further, the support attachment should be nestable along its horizontal axis when attached to or detached from the shopping cart. The present invention is directed toward further solutions in this art. The object of the present invention is to securely and safely accommodate at least one child while also transporting a basket of goods.

Another object of the present invention is to provide a child support carrier in the form of a free-standing support structure for securely and safely accommodating at least one child while transporting a basket of goods.

Another object of the present invention is to provide a support structure for securely and safely accommodating at least one child and at least one basket.

Another object of the present invention is to provide a support structure for securely and safely accommodating at least one child that is attachable to a shopping-cart or a hand basket carrier shopping cart.

Another object of the present invention is to provide a free-standing child support carrier that resembles a vehicle.

Yet another object of the present invention is to provide a free-standing child support carrier that is nestable with other similarly configured carriers.

Another object of the present invention is to provide a child carrier attachable and/or detachable to a front or rear end of a shopping-cart.

A further object of the present invention is to provide a child support carrier that is nestable while attached to a shopping-cart.

Another object of the present invention is to provide a child support carrier that holds bulk items.

Another object of the invention is to provide a child support carrier that is attachable to a shopping cart with a secure attaching device that allows easy detachment. The child support carrier need not be free-standing.

Other features and advantages of the present invention will become apparent from the following description of the invention which refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which:

FIGS. 14, 15 and 16 show alternative attachment devices for coupling the child carrier and shopping cart of FIG. 13.

DETAILED DESCRIPTION OF PREFERRED EMBODIMENTS OF THE INVENTION

Figure 1:
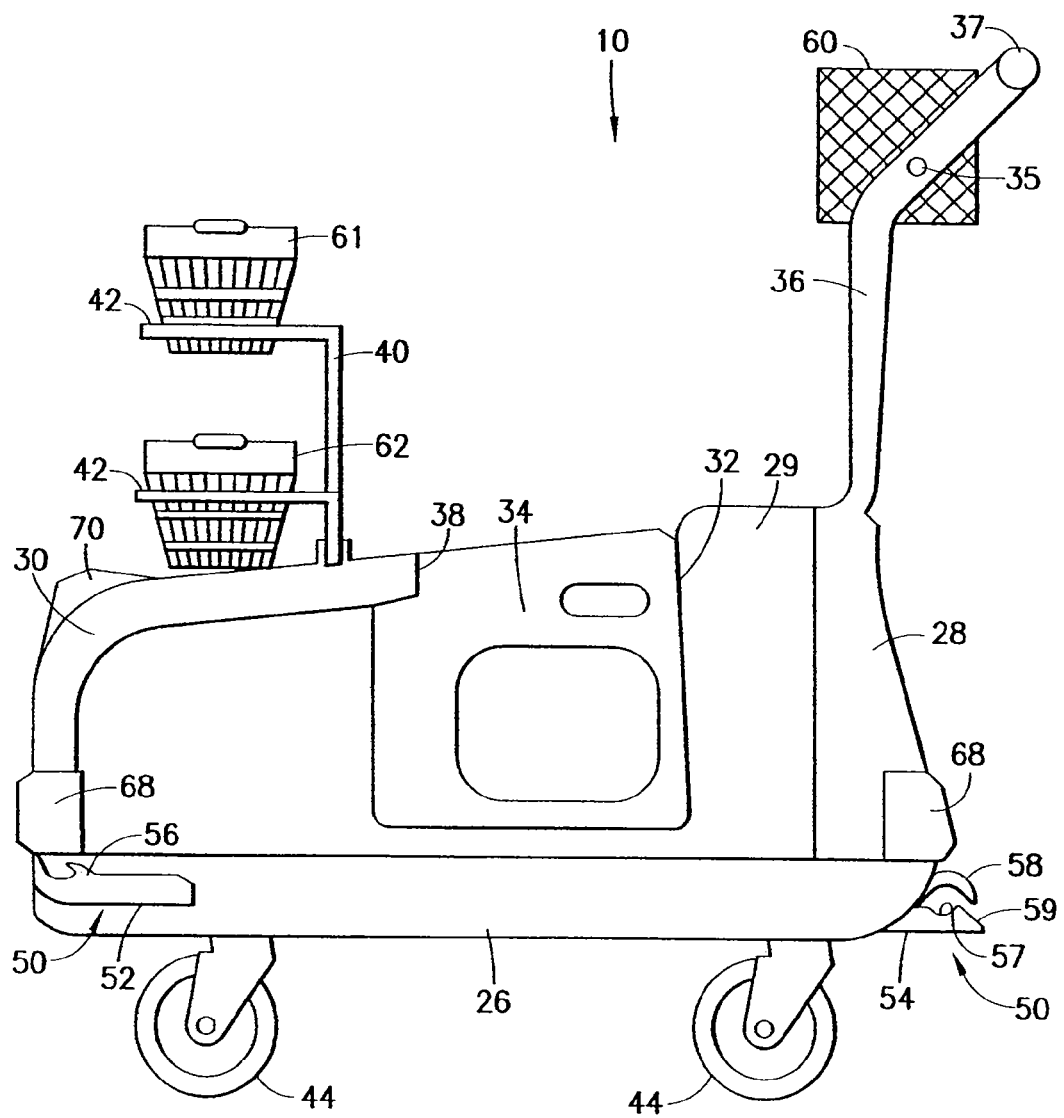
FIG. 1 illustrates a side view of an embodiment of the free-standing child support carrier of the present invention having two personal baskets nearest its front end and one fixed basket nearest its rear end while resembling a vehicle and being attachable to a shopping-cart at the carrier's front or rear ends, These baskets may include a permanently attached basket in addition to removable baskets.

The child support carrier of the present invention may be constructed as a free-standing support structure 10 having a partially enclosed interior cavity defined by a base member 26 having front and rear ends, a rear wall 28, a front wall 30 and two side walls 29 and 31. The front wall 30 extends upward from the front end of the base member 26. The rear wall 28 extends upward from the base member 26 nearest the rear end thereof opposite the front wall 30. The two side walls 29, 31 each extend along opposite sides of the base member 26 between the front and rear walls 30, 28 respectively. A seat 42 is attached to the base member 26 within the partially enclosed interior cavity nearest the rear end of base member 26. At least one opening 32 is provided in at least one of the walls 28, 29, 30, 31 for allowing access to the seat 42 by one or more children. At least one door 34 may be hinge connected to the wall, any one of walls 28, 29, 30, 31, having the at least one opening 32 for selectively closing the at least one opening 32. In the embodiments shown in FIGS. 1 to 12, at least three wheels 44, and optionally four wheels, are attached to an under side of the base member 26 for contacting a floor under the support structure 10. Fewer wheels can be used if the support structure is not to be free-standing, as shown in FIG. 13.

The support structure 10 of FIGS. 1-12 rests upon at least three, preferably four, wheels 44. The wheels 44 include caster or swivel-caster wheels and are capable of supporting the support structure 10 in a free-standing stable fashion. Preferably, attached to the underside of the base member 26 are two swivel-caster wheels 44 at or nearest the front end opposite two non-swivel caster wheels at or nearest the rear end. This configuration may be reversed or all wheels may be swivel casters.

A first frame member 36 extends from the support structure 10 to form a handle 37 for pushing or pulling the support structure 10 along the floor on its wheels 44. The first frame member 36 may also be configured to accommodate one or more personal baskets 60 for holding items such as groceries. A second frame member 40 may also extend from the support structure 10. The second frame member 40 is also configured to accommodate one or more personal baskets 60. The frame members 36, 40 may be integrally constructed or molded with the support structure 10 or may be separate structures attachable to the support structure 10.

The baskets 60 may be affixed to the frame members 36, 40 or may be releasably attached, rest upon or be suspended from the frame members 36, 40.

At least one engagement member 50 extends from the support structure 10 for receiving a shopping-cart 12. The at least one engagement-member 50 may be configured to receive the shopping-cart at or nearest the front or rear ends of the support structure 10.

Figure 3:
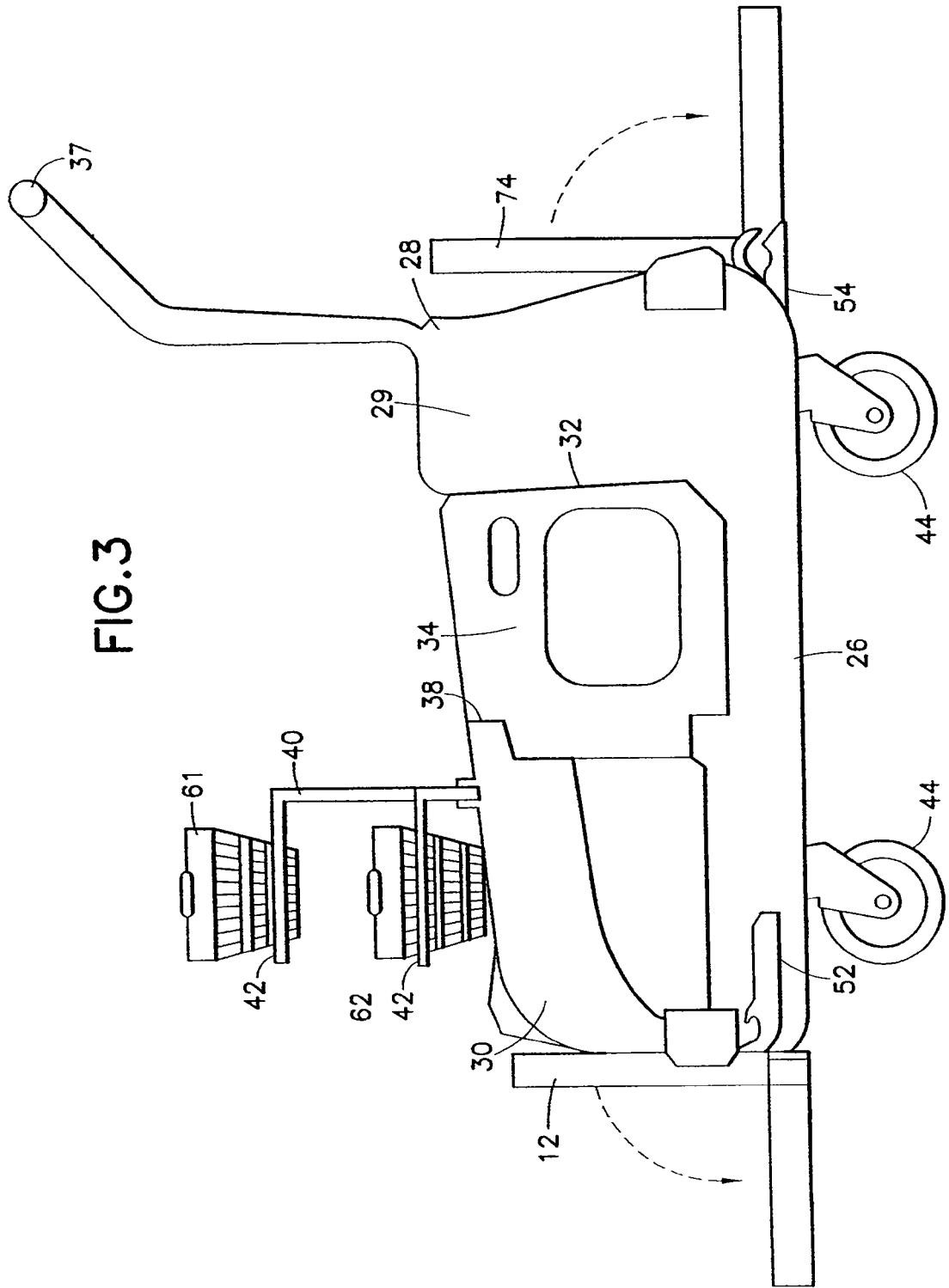
FIG. 3 illustrates the child support carrier of the present invention as shown in FIG. 2, but further comprising two retractable storage platforms, each platform being attached to an end of the carrier. This platform may be configured within the body of the carrier (not shown).

As shown in FIG. 3, at least one retractable platform may be provided to selectively extend from the support structure for additional storage space for items such as groceries or personal effects when the carrier is used as a personal cart or can be folded away so that the carrier can be attached to a shopping cart without obstruction. A non-retractable area may be provided within the body portion of the support structure 10 (not shown) and/or the retractable support structure may be non-retractable and remain at the front or rear or anywhere on the support structure.

As shown in FIG. 1, the front wall 30 of the support structure 10 may slope toward the rear wall 28 to resemble the shape of a vehicle. Side walls 29, 31 extend between the front and rear walls 30, 28 respectively. Side wall 29 is shown to have an opening 32 between an end of the slopping front wall 30 and the rear wall 28. Side wall 3 1, opposite side wall 29, is not shown in FIG. 1. A door 34 is hinge mounted to the side wall 29 at the opening 32 so that the opening 32 can be selectively closed. The opening 32 provides access to the seat (not shown) in the partially enclosed cavity of the support structure 10. The seat (not shown) is capable of accommodating one or more children, preferably two. Further resembling a vehicle, the front and rear walls 30, 28 respectively may be molded with false bumpers 68, headlights (not shown), brake lights (not shown), wheels (not shown), hood-ornament 70, grill/vents (not shown), etc. . . .

Figure 2:
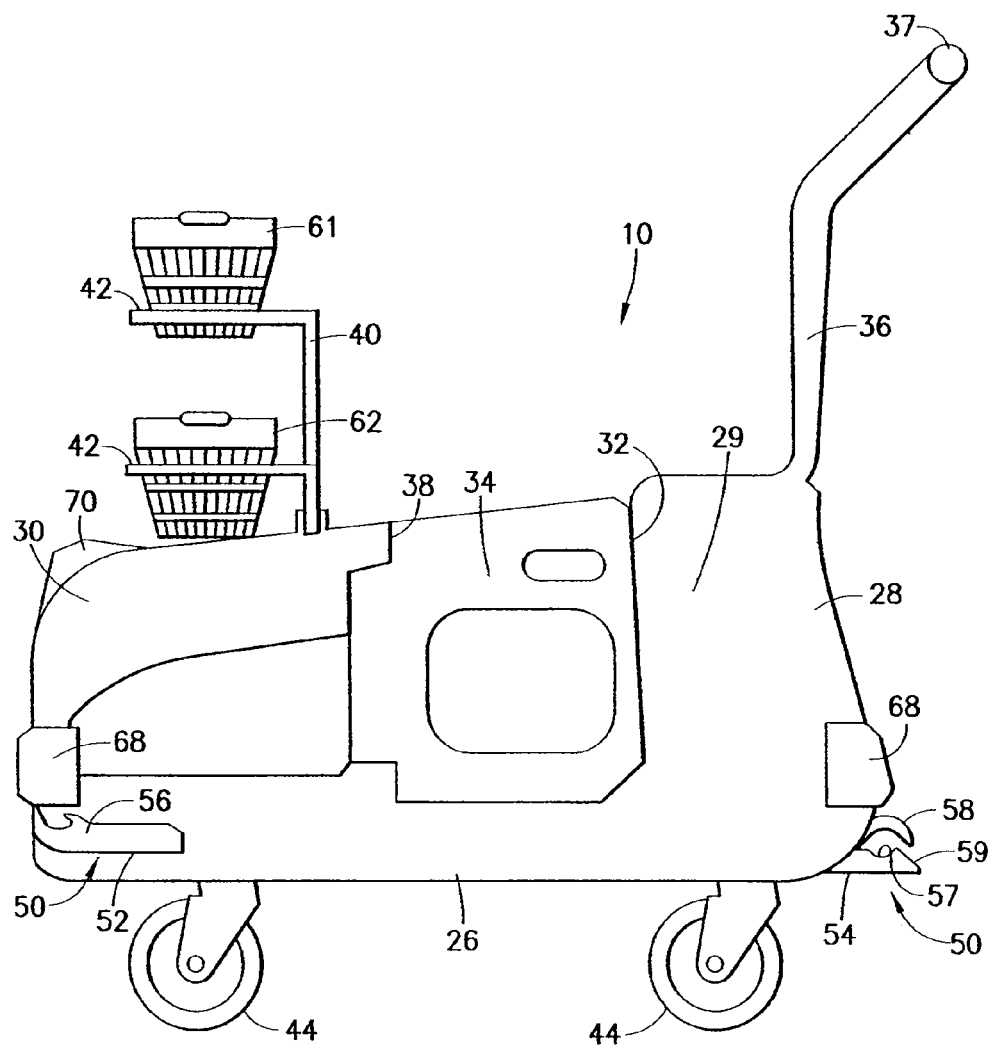
FIG. 2 shows a side view of another embodiment of the free-standing child support carrier of the present invention having two personal baskets nearest the carrier's front end while resembling a vehicle and being attachable to a shopping-cart at the carrier's front or rear ends.

The support structure 10 is shown to have a first frame member 36 extending upward from the rear wall 28. The first frame member 36 is shown to be formed integrally to the rear wall 28, but the first frame member 36 may also be a separate attachable member and may be made of metal, hard plastic or other stiff material. The first frame member 36, as shown in this example, has a distal end furthest from the rear wall 28 forming a handle 37 for pushing or pulling the support structure 10 along the floor. As shown in FIGS. 1-3, the support structure 10 is configured to accommodate two personal baskets 61 and 62. The first frame member 36 may be configured to receive a fixed basket 60 near the handle 37. The fixed basket 60 is affixed to the first frame member 36 nearest the handle with an attachment device 35 such as a screw. The attachment device 35 may also include, a nut and bolt, a rivet, glue, welds (when metallic), a clip, a clamp or other equivalent attachment means. A second frame member 40 is shown to extend from an upper side of the front wall 30. The second frame member 40 is configured with shelf regions 42 to accommodate a first and second personal basket 61 and 62 respectively. The first and second baskets 61 and 62 respectively are shown to be standard tapered baskets having an opening opposite a bottom surrounded by four tapered sides, wherein the bottom has a smaller perimeter than the opening. The shelf regions 42 extending substantially horizontally from the vertical second frame member 40. The shelf regions 42 have an opening for each of the first and second baskets 61 and 62 respectively to sit in. The openings in the shelf regions 42 have a perimeter smaller than the perimeter of the opening of the baskets 61 and 62. The tapered sides nearest the large openings of the baskets 61 and 62 rest upon the smaller openings of the shelf regions 42 when the baskets are placed therein. As such, baskets 61 and 62 are securely resting in the opening provided in the shelf regions 42 of the second frame member 40. This form of securing baskets 61 and 62 allows for the baskets 61 and 62 to be easily inserted and removed, thus allowing multiple baskets to be held securely by the support structure 10 and be removed during unloading or walked around with individually as hand held baskets while gathering goods.

The support structure 10 of the present invention is attachable to other similarly structured support structures or with shopping-carts via the at least one engagement member 50 which may take many forms. As shown in FIG. 1, the support structure 10 is provided with a front engagement member 52 and a rear engagement member 54. The front engagement member 52 is shown to have a clamp 56 extending from each of the side walls 29, 31 toward the front wall 30 for receiving the vertical frame members (not shown) of a shopping-cart (not shown) between the side wall 29, 31 and the clamp 56. The rear engagement member 54 is shown to be a hinged clamp 58 opposite a stiff member 59 having a groove 57 extending from the rear wall 28 of the support structure 10 for receiving the horizontal frame member of a shopping-cart. The hinged clamp 58 is hinged to pivot away from the rigid member 59 when a horizontal frame member of a shopping-cart is driven into it. The hinged clamp 58 is biased, e.g., by a spring, to clasp down over the horizontal frame member once inserted. See FIGS. 5 and 6. The horizontal frame member is then nested between the hinged clamp member 58 and the rigid member 59 in the groove 57 provided. The front and rear clamps 56, 58 respectively are configured to easily receive shopping-cart frame members. The clamps 56, 58 apply a nesting force to nest or secure the frame members in the clamps. The engagement members are further configured to easily release the shopping-cart's frame members therefrom with the application of a release force opposite to the nesting force while sliding the frame-member out of the clamps 56, 58.

FIG. 2 shows a side view of another embodiment of the free-standing child support carrier of the present invention incorporating all of the features as described in FIG. 1, however this embodiment lacks the first fixed basket 60 attached to the first frame member 36. As such, there are no obstructions in the rear of the support structure 10. This allows the front end of a shopping-cart-basket to be received between the rear wall 28 and handle 37 when a shopping cart is connected to the rear engagement member 54 or during nesting. See FIG. 6. Also, the rear wall 28 can be retractable, thereby allowing the shopping cart basket to extend as far as the second support structure 36 nearest the distal end 38 of the front wall 30 during nesting.

In FIG. 3, a front retractable platform 72 is pivotally connected to the front wall 30 and a rear retractable platform 74 is pivotally connected to the rear wall 28. A first and second biasing means may be provided to apply a bias retracting force to the front and rear platforms 72, 74 respectively in order to keep the platforms 72, 74 in a retracted position when not in use. The platforms may be extended from their retracted position by applying a force opposite the retracting forces. When extended, the platforms provide additional space for carrying items such as bulk goods. This is especially convenient when the fixed basket 60 is not provided and the carrier is used as a personal cart, i.e. without connecting to a shopping art.

Figure 4:
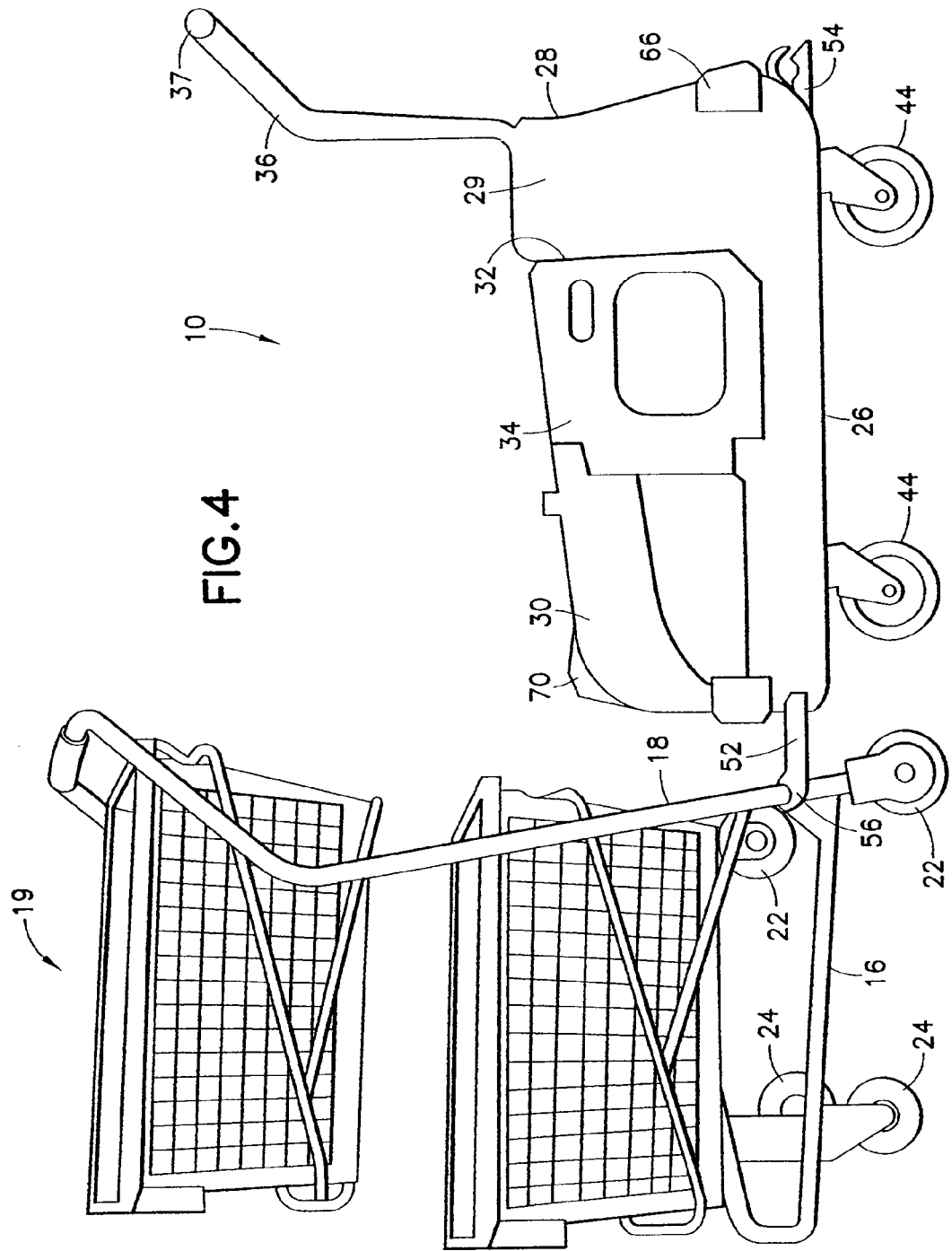
FIG. 4 shows a side view of an embodiment of the free-standing child support carrier of the present invention not having any personal-baskets attached to a double-decker hand basket carrier shopping-cart at the carrier's front end while remaining capable of attaching to a second shopping-cart at the carrier's rear end.

FIG. 4 shows a side view of an embodiment of the free-standing child support carrier of the present invention not having any personal-baskets attached thereto. The carrier is attached to a double-decker hand basket carrier shopping-cart 19 at the carrier's front end while remaining capable of attaching to a second shopping-cart at the carrier's rear end via the rear engagement member 54. In this embodiment, the front engagement member 52 is shown to extend from the front wall 30 of the support structure 10 to receive the vertical frame member 18 of the double-decker hand basket carrier shopping-cart 19. In this instance, a user would control the position cart 19 and the carrier by pushing on the handle 37 of the first frame member 36 extending from the support structure 10. Also, given that the support structure 10 is attached to a shopping-cart the second frame member is removed because additional baskets are not required. However, the second frame member can be reconnected if necessary.

Figure 5:
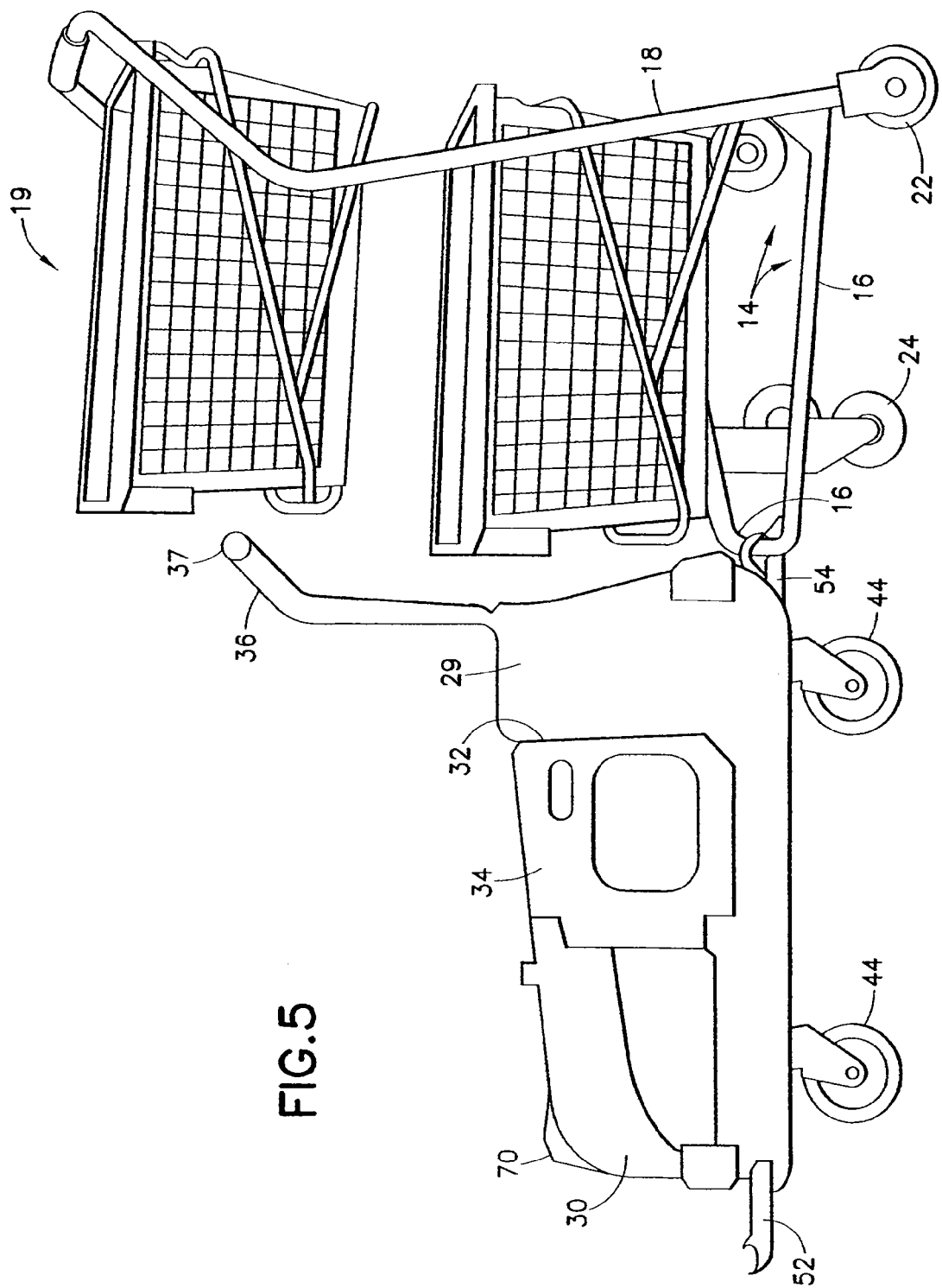
FIG. 5 illustrates a side view of the embodiment of the child support carrier of the present invention as depicted in FIG. 4, however here the double-decker hand basket carrier shopping cart is attached to the carrier's rear end and the carrier's front end remains capable of attaching to a second shopping-cart.

FIG. 5 shows the child support attachment device of the present invention attached by its rear engagement member 54 to the horizontal frame member 16 of a double-decker hand basket carrier shopping-cart 19. As such, pushing on the shopping-cart 19 controls the position of the child support carrier. The support structure 10 in this Figure is shown without the second attachment member, providing added visibility to a child seated therein. The carrier is attachable to many forms of shopping-cart, whether it be a conventional single-basket cart, a double-decker hand basket carrier shopping cart or some other variation thereof, because most shopping-carts are premised on the same simple frame structure 14.

Figure 6:
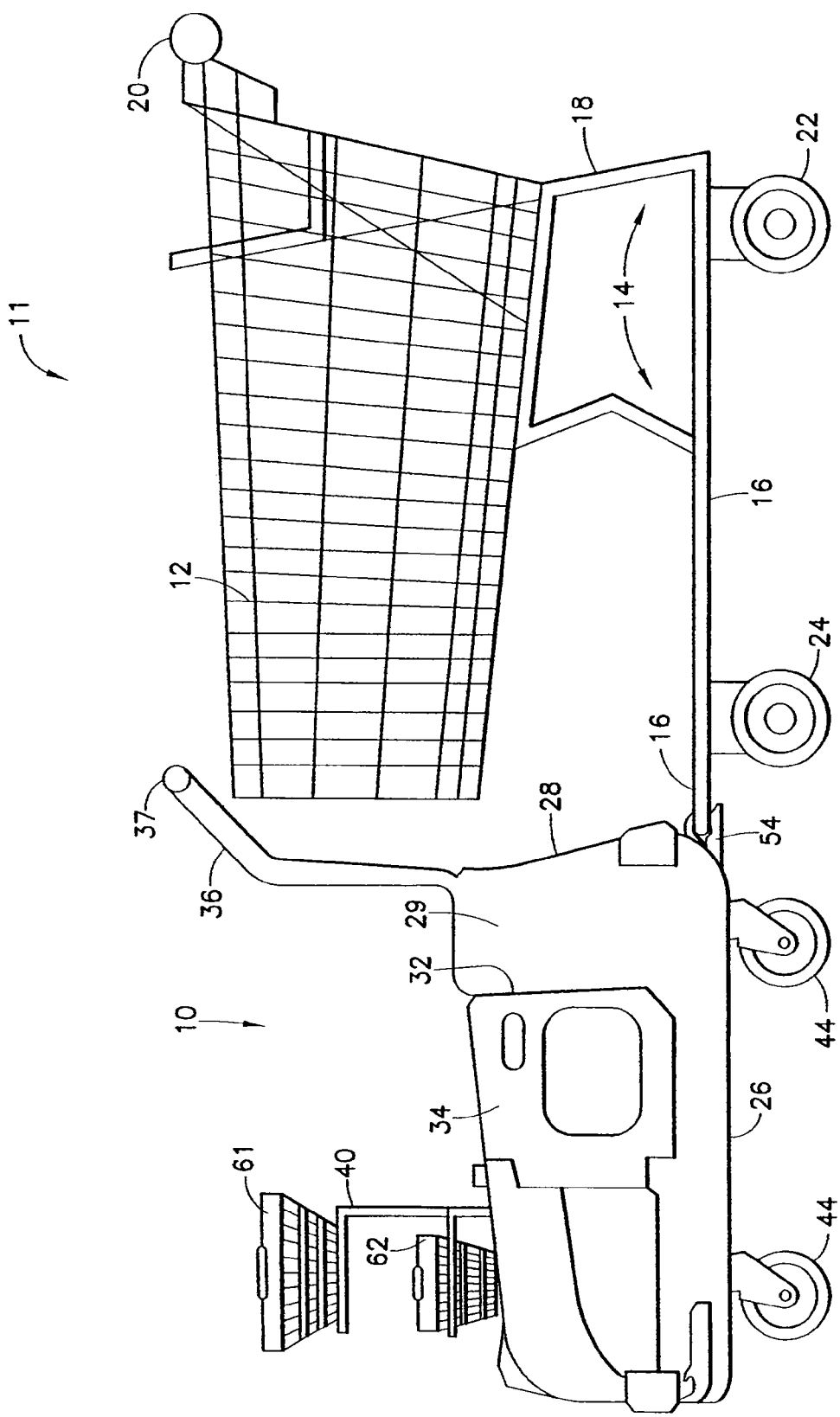
FIG. 6 shows the carrier of the present invention as previously described in FIG. 2 attached to a conventional shopping-cart at the carrier's rear end while the carrier's front end remains capable of attaching to a second shopping-cart.

Similarly, FIG. 6 illustrates the support structure 10 being attached to a conventional shopping-cart 11 in the same way as that in FIG. 5; however, in this instance the support structure 10 also has the second frame member 40 attached to its front wall 30. The second frame member 40 is holding two removable baskets 61, 62 in a stacked fashion. The baskets 61, 62 can hang from or rest on the second frame member 40. Also, the shopping-cart in FIG. 6 is a standard shopping-cart having one large basket area. In FIG. 5, the shopping-cart is a variation of the standard shopping-cart having two slightly smaller sized baskets in a stacked arrangement. The child support attachment of the present invention is capable of attaching to a variety of shopping-cart designs, i.e. the standard shopping-cart shown in FIG. 6 or the stacked shopping-cart shown in FIG. 5, because it attaches to the frame members 14 which are customarily situated in a similar fashion.

Figure 7:
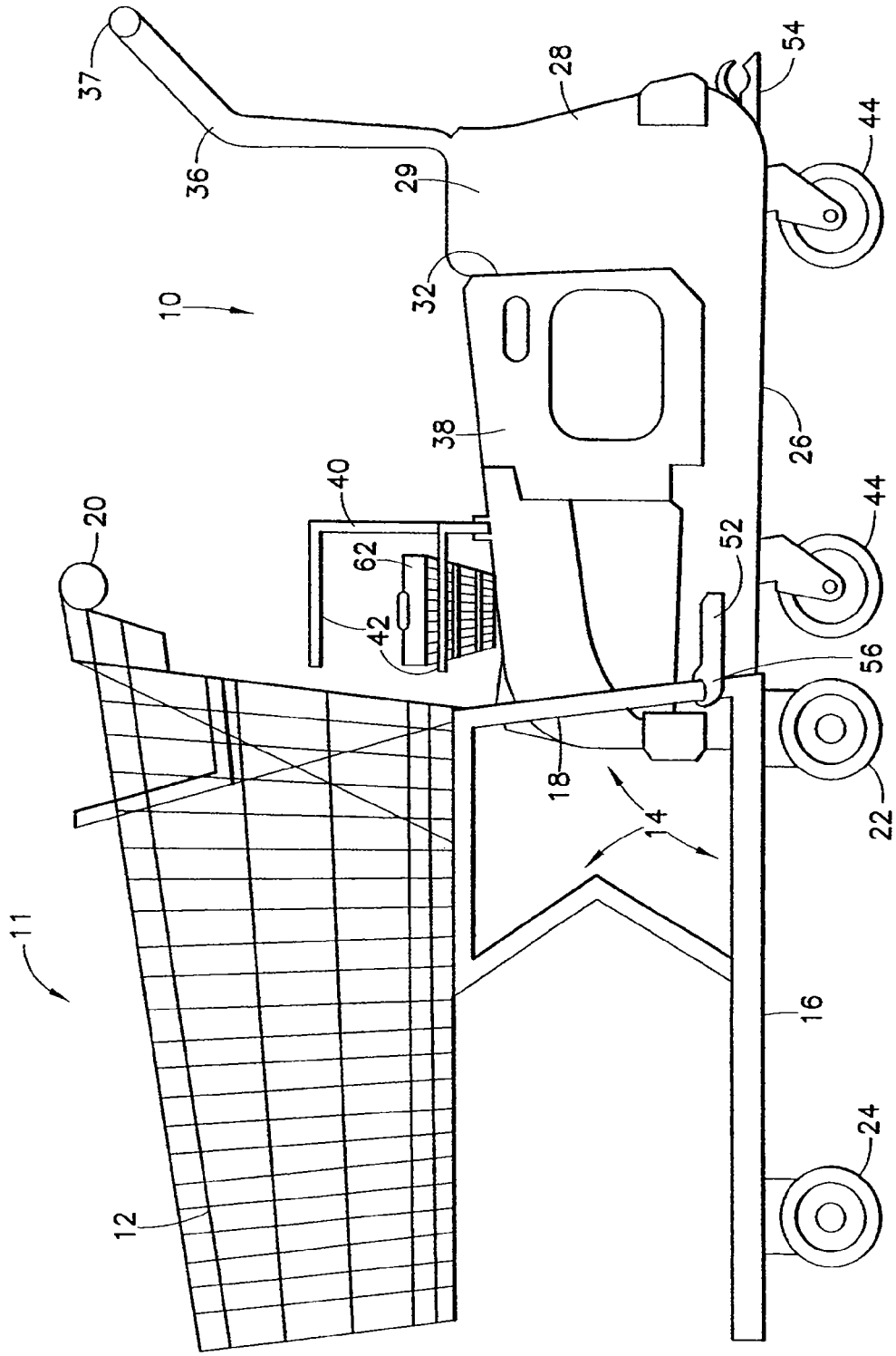
FIG. 7 illustrates the carrier of the present invention as previously described in FIG. 2 but having only one personal basket attached thereto while the carrier is attached to a conventional shopping-cart at the carrier's front end while the carrier's rear end remains capable of attaching to a second shopping-cart.

FIG. 7 illustrates the child support attachment device of the present invention connected to the rear of a standard shopping-cart 11 via the front engagement member 52 of the support structure 10. Here the front engagement member 52 is a clamp 56 extending from each of the side walls 29, 31 of the support structure 10 toward the front wall 30 for receiving the vertical frame members 18 of the shopping-cart 11 between each respective side wall 29, 31 and clamp 56. The clamp 56 is contoured to easily slide a shopping-cart's vertical frame member 18 between the clamp 56 and the side wall 29 but is contoured and biased to resist removal of the shopping-cart's frame member 18 from the clamp 56 without the application of a removal force to the clamp 56 opposite the biasing force. The support structure 10 is narrower in width at its front wall 30 than the distance between the two vertical frame members 18 at the rear of the shopping-cart 11. As such, a portion of the support structure 10 nearest the front wall 30 is nested within the frame 14 of the shopping-cart 11 while the frame 14 is also grasped by the front engagement member 52. It also should be noted that engagement member 52 may be mounted anywhere near the front portion of support structure 10, or from 26 and/or extend forward of support structure 10 and engage the chassis 16 or frame 14 and/or 18 in many different configurations. Notably, the support structure 10 also has a rear engagement member 54 for receiving a second cart at its rear. As such, the support structure 10 can receive a shopping-cart simultaneously in the front and the rear. This facilitates gathering of carts and support carriers around the store and parking lot and in efficient storage of the support carriers by nesting when engaging the front and rear engagement members with shopping-carts or accommodating large families.

Figure 8:
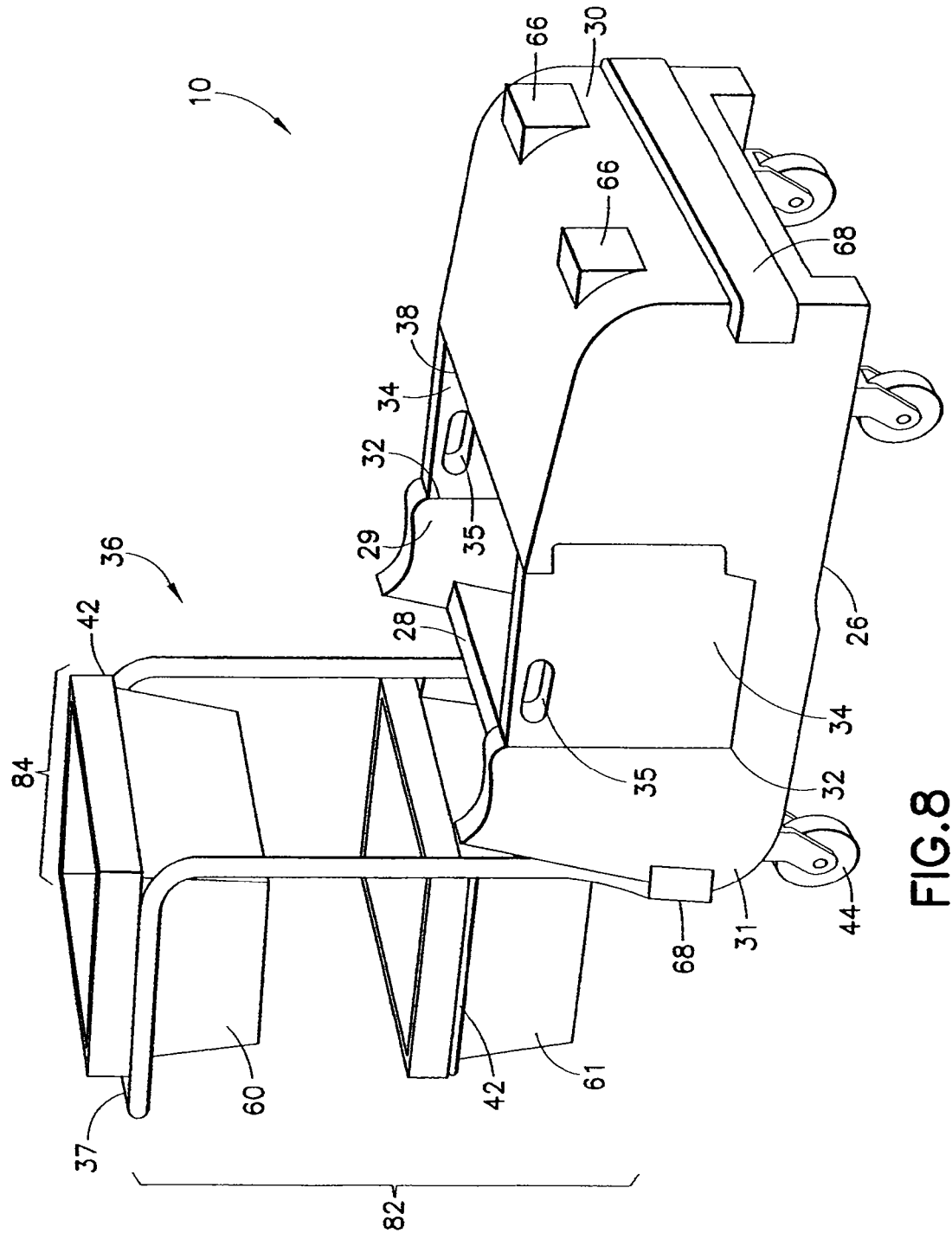
FIG. 8 shows a perspective front view of an embodiment of the free-standing carrier of the present invention wherein the carrier has four wheels, two doors and two personal baskets nearest the carrier's rear end while resembling a vehicle.
Figure 9:
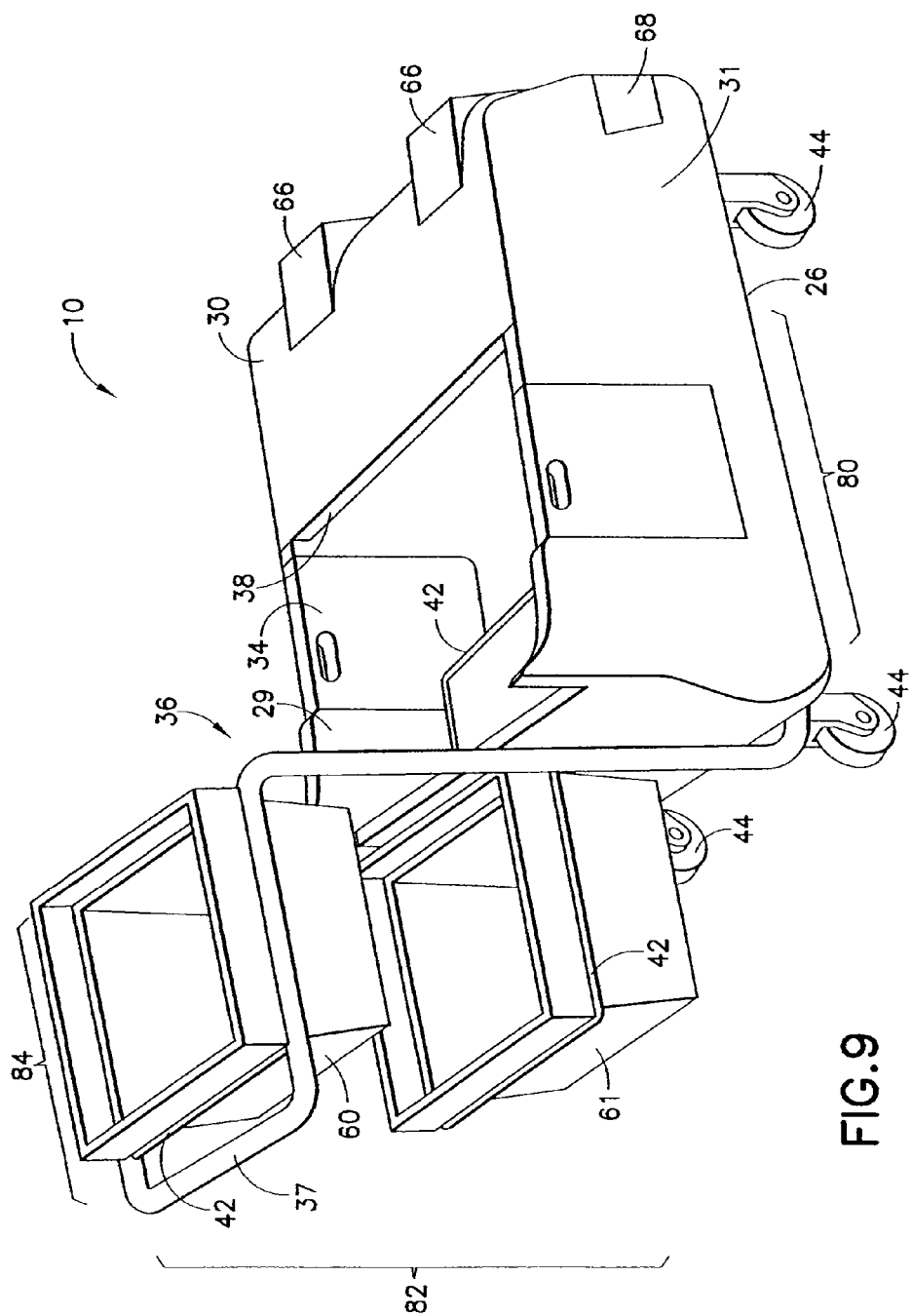
FIG. 9 illustrates a perspective rear view of the embodiment of the present invention shown in FIG. 8.
Figure 10:
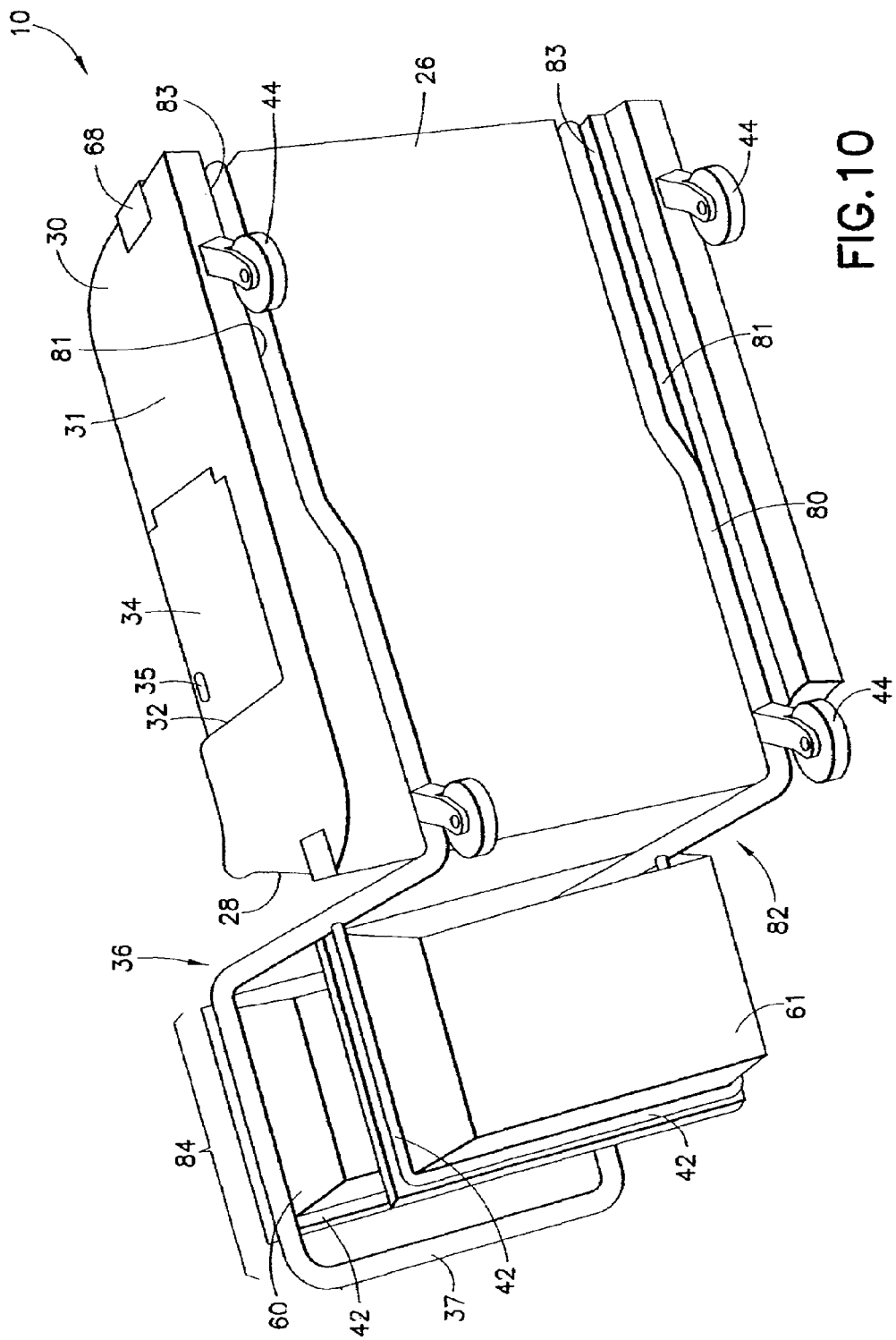
FIG. 10 shows a bottom perspective view of the embodiment of the present invention shown in FIG. 8.

FIGS. 8-12 shows a child support carrier that receives personal baskets typically provided by the retailer. The cart contains a frame which accommodates the store-provided plastic handbaskets. FIGS. 8, 9 and 10 provide front, rear and bottom perspective views of an exemplary embodiment of the child support carrier of the present invention in which the first frame member 36 is a separate attachable member to the support structure 10. The front wall 30 is sloped to resemble a vehicle. Located on the front wall 30 are fake headlights 66 to improve the resemblance to a vehicle. Also molded into the front and rear walls 30, 28 respectively are fake bumpers 68 for aesthetic purposes. The support structure 10 is provided with two doors 34, each being hinge mounted to the side walls 29, 31 for selectively closing the respective openings 32 therein. Each door 34 is provided with a handle 35 for grasping the door 34. Each door 34 may also be provided with a latch or other securement device (not shown) to ensure that the door 34 does not unwantedly swing open. The support structure 10 is supported by four caster-wheels 44 attached to the under side of the base member 26 nearest the corners thereof. The caster-wheels 44 nearest the front end of the base member 26 are attached directly to the base member 26 and are preferably capable of swiveling. The remaining two caster-wheels 44 are attached to the first frame member 36 at a point nearest the rear end of the base member 26. The first frame member 36 is a separate tube frame member attached to the under side of the base member 26. The first frame member 36 is configured to accommodate two baskets 60 and 61 and forms a handle 37 for pushing the support structure 10 along a floor. Looking to FIGS. 8 through 12 the details of the tube frame construction of the first frame member 36 are apparent. Baskets 60 and 61 are typically removable, but they may also be fixed, as shown in FIG. 1.

As shown in FIGS. 8 through 12, the first frame member 36 is primarily constructed of two metallic-tubes, for example of one inch diameter, running parallel to each other, the tubing being configured to form the first frame member 36 having three portions: an attachment portion 80, an extension portion 82 and a handle portion 84. The attachment portion 80 is formed by the two parallel metal tubes running lengthwise along the underside of the base member 26. The tubes in the attachment region 80 have a non-linear depression forming a depression region 81 in the attachment region 80 nearest the front end of the base member 26. The underside of base member 26 has two grooves 83 running lengthwise nearest its front end. Each groove 83 receives the depressed portion 81 of the tubes. A series of bores 85 are provided through the depressed region 81 of each tube for receiving screws or bolts therethrough for securely attaching the first frame member 36 to the support structure 10. At the rear wall 28 the tubes have a first bend of about 90 degrees upward to form the extension region 82 of the first frame member 36. In the extension region 82, the tubes extend vertically away from the base member 26 a predetermined distance from the base member 26. At an end of the extension region 82 furthest from the base member 26, the tubes make an approximately second 90 degree bend away from the support structure 10 to form the handle region 84. The tubes extend away from the extension region 82 a predetermined distance in the handle region 84 before being joined together by a cross-member tube forming a handle 37. It is advantageous to make the distance between the first and second bends large enough to accommodate a front portion of a shopping-cart between the second bend and the base member 26. The tubing in the handle region 84 may extend far enough away from the extension region 82 so that a basket 60 can be accommodate in the handle region 84 between the handle 37 and the extension region 82, as shown in FIG. 8 through 10. The first frame member may have shelf members 42 formed rom, for example, ⅜ inch rod. The rod traces the perimeter of an opening for receiving the basket. A shelf member extends from the extension region of the first frame member in the same direction that the handle region extends from the extension region for receiving a basket under the handle region. The baskets 60, 61 rest in shelf regions 42 sized to be slightly smaller than the opening of the baskets 60, 61 as described in FIG. 1. However, the notable difference in this instance is that the opening in the shelf regions 42 are constructed of tubing, for example of ⅜ inch diameter, and are connected to the first frame member 36, not the second frame member 40. As such, the baskets 60, 61 can rest securely on the first frame member 36 for loading and can be easily replaced or removed. Also, four caster wheels 44 are preferably used in this embodiment, two non-swivel nearest the rear wall 28 and two swivel castor-wheels 44 nearest the front wall 30 of the support structure 10. This wheel arrangement may be reversed.

Figure 11:
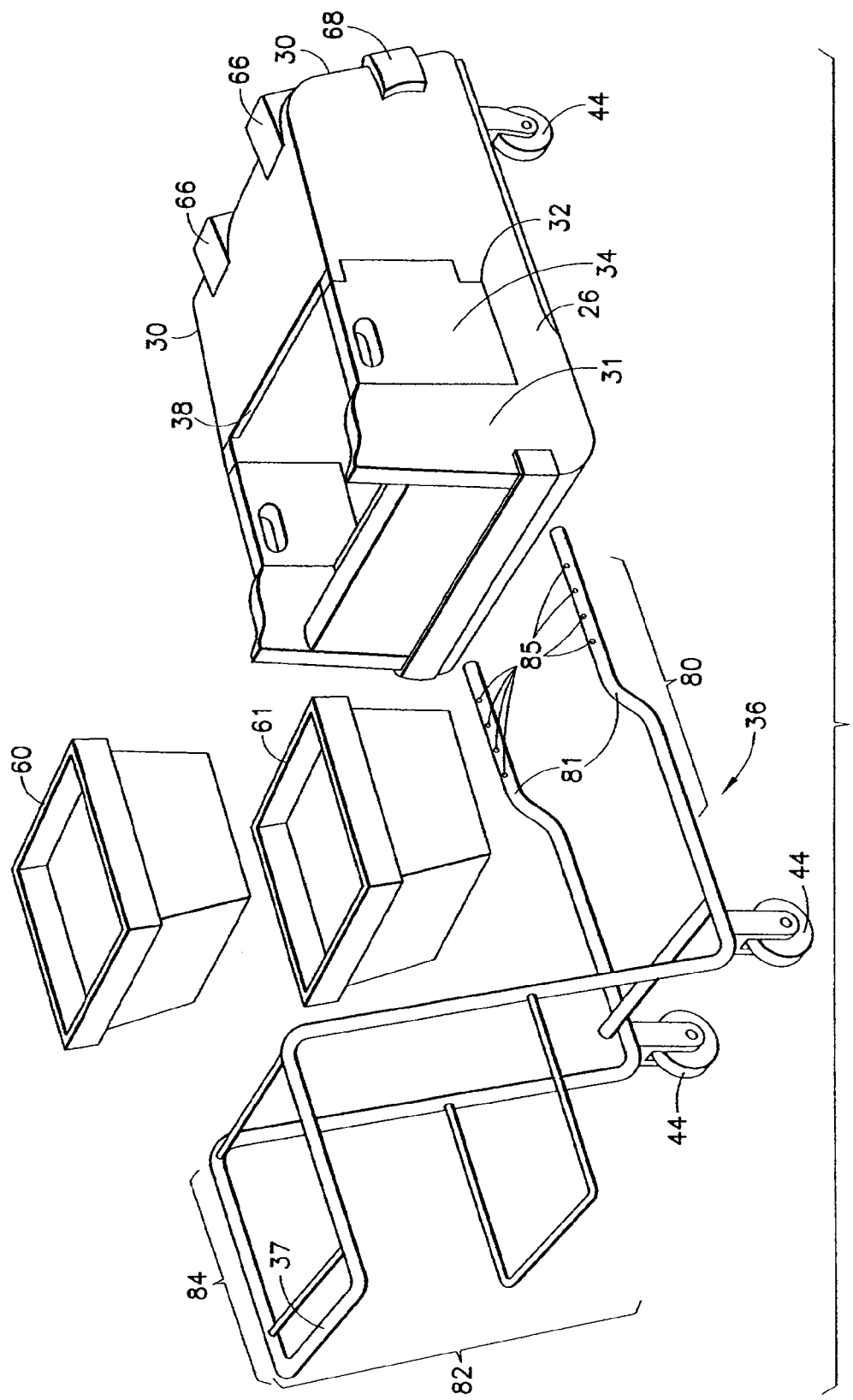
FIG. 11 illustrates a rear perspective assembly drawing of the embodiment of the carrier of the present invention illustrated in FIGS. 8 through 10.

FIG. 11 is an assembly drawing of the exemplary embodiment of the child support attachment device shown in FIGS. 8 through 10. The first frame member 36 has two shelf regions in the form of tubing, e.g., ⅜ inch diameter, that traces the basket outline. The basket regions are attached to the handle region 84 and the extension region 82 of the first frame member 36 thereby allowing the baskets 60, 61 to rest between the tube-trace and the tube-frame member behind the support structure 10. Two caster-wheels are attached to the first frame member 10 at the bend between the attachment and extension regions 80, 82 respectively.

Figure 12:
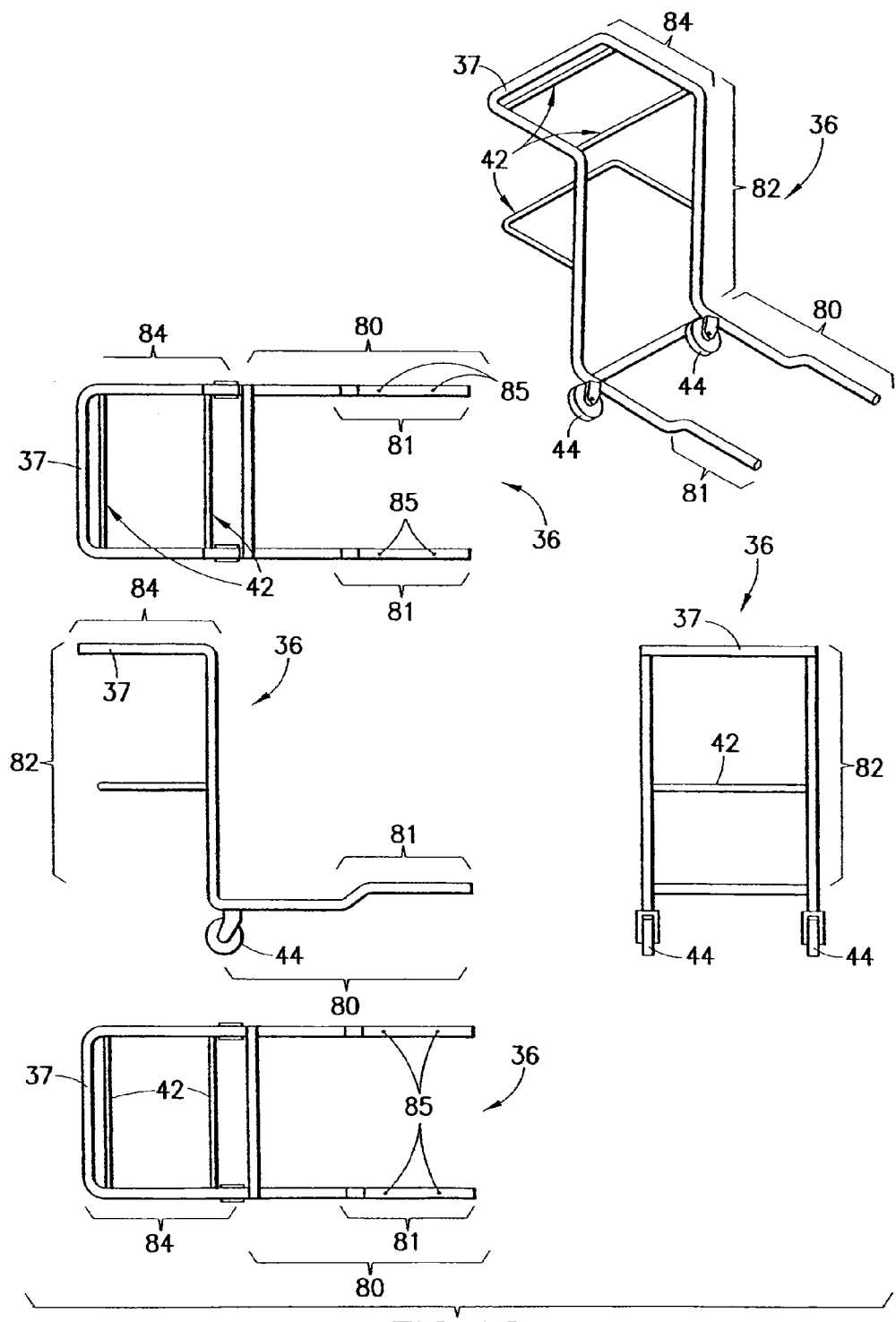
FIG. 12 shows a dimensioned drawing of a first frame member of the child support carrier of the present invention.
Figure 13:
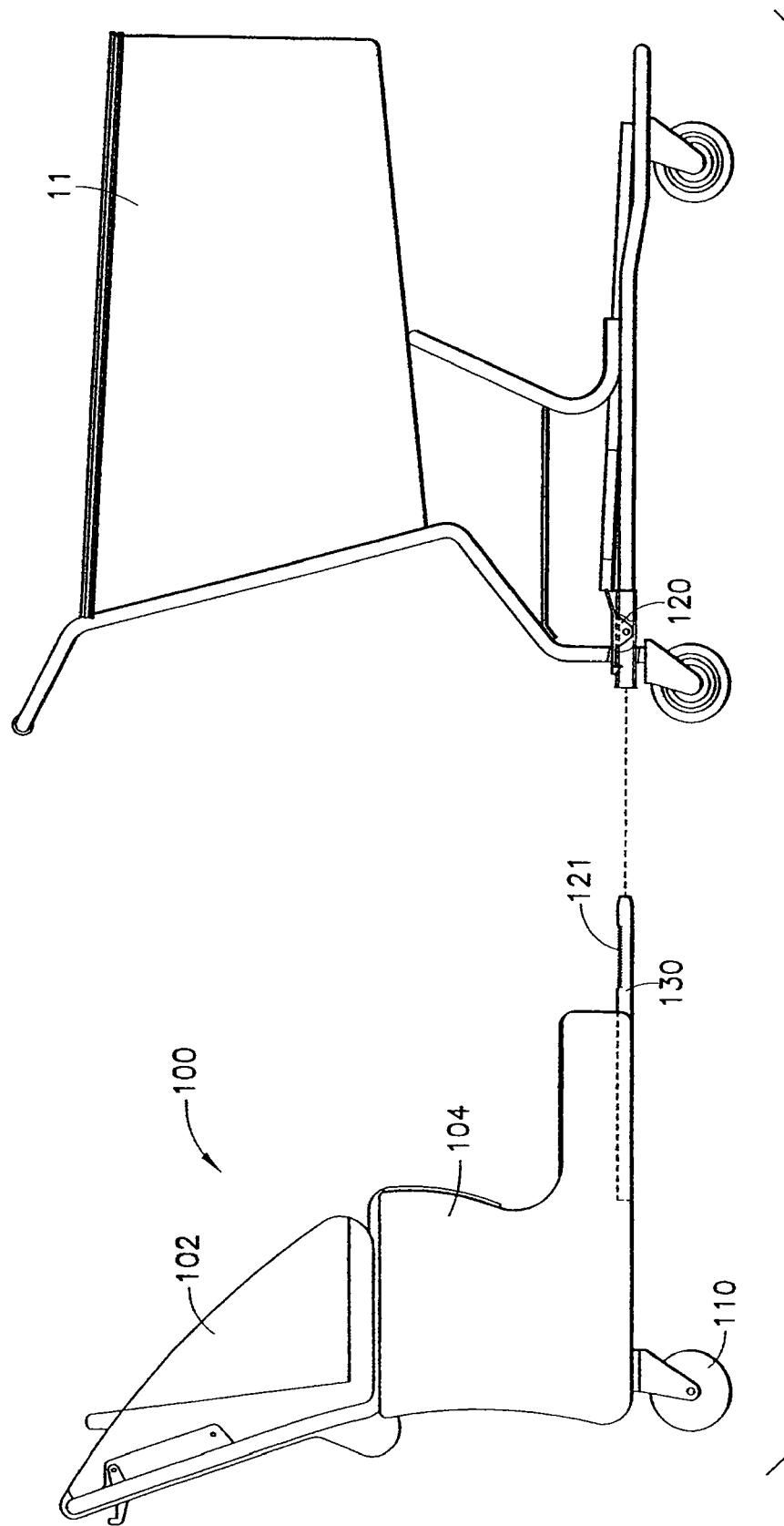
FIG. 13 shows an embodiment of a non free-standing child carrier attachable to a shopping cart, also shown in unassembled view.

FIG. 12 illustrates a preferred embodiment of the first frame member to be constructed of a continuous piece of tubing, e.g., one inch diameter tubing. The shelf or basket regions are preferably constructed of rod, e.g., ⅜ inch diameter. The handle region 84 is shown to extend roughly 16 inches from the extension region 82, and the distance between the first and second bends is preferably roughly 27 inches. The attachment region 80 extends roughly 28 inches from the extension region 82. The shelf regions 42 are traced to have a width of roughly 12 inches and a length (being the width of the overall frame member) of 18 inches formed by the width from center line to center line of the parallel 1 inch tubing.

FIG. 13 shows an embodiment of a non-free-standing child support carrier 100 having a child seat 102 disposed on a support base 104 supported on two swivel wheels 110 (only one is shown) that is attachable to a shopping-cart 11 at the rear of the cart via attachment means, options for which are shown in detail in FIGS. 14, 15 and 16. The child seat 102 may be detachable from the support base 14. FIG. 13 shows a pivotable ratchet receiving device 120, mounted on a receiving tube 126 which is attached to the cart by any suitable means including bolting, riveting or welding or any other fastening means. FIG. 14 shows the ratchet receiving device 120 pivotably mounted on pin 123 and the mating toothed ratchet 121 on member 130 mounted to the carrier 100 by any suitable means, including bolting, riveting or welding or any other fastening means. The member 130 is received in the receiving tube 126 and the ratchet pawl 124, biased by a spring, releasably secures the two members together.

FIGS. 15 and 16 show alternative attachment devices 120A, 121A and 120B, 121B. As shown, devices 120, 120A pivot on a pin 123 and are preferably spring biased in the position shown. A pawl 124 of FIG. 14 securely receives teeth 121 to secure the carrier 100 to the cart in an adjustable position. Similarly, pin 125 of FIG. 15 is received in any of holes 126 in the member 130A.

In FIG. 16, a tube 120B has a series of holes 132 which receive a spring loaded pin 134 on member 130B to securely but detachably fix carrier 100 to cart 11.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A child support carrier for detachable connection to a shopping cart, the child support carrier comprising:
a body having a space thereon for supporting a child;
a plurality of wheels on the body for stably supporting the body for rolling movement on the ground;
the body having an attachment mechanism for detachably coupling to a frame of the shopping cart, to allow movement of the child support carrier and shopping cart as a unit, the child support carrier being capable of use independently of the shopping cart when not attached to the shopping cart,
wherein the body has a front portion and a rear portion, the attachment mechanism comprising a first attachment mechanism at the front portion and a second attachment mechanism at the rear portion, each for detachably coupling to a frame of the shopping cart, wherein the child support carrier can be attached behind the shopping cart by the first attachment mechanism or in front of the shopping cart by the second attachment mechanism.

2. The child support carrier of claim 1, further comprising a frame for receiving a shopping basket.

3. The child support carrier of claim 2, wherein the shopping basket is removable.

4. The child support carrier of claim 2, wherein the shopping basket is fixed to the child support carrier.

5. The child support carrier of claim 1, further comprising a handle attached to the body.

6. The child support carrier of claim 5, wherein the handle has a frame for supporting a shopping basket.

7. The child support carrier of claim 1, wherein the handle can be used to manipulate the child support carrier independently of the shopping cart or as a unit with the shopping cart.

8. The child support carrier of claim 1, wherein the body has three wheels.

9. The child support carrier of claim 1, wherein the body has four wheels.

10. The child support carrier of claim 1, where the body has an entry door.

11. The child support carrier of claim 1, wherein the attachment mechanism comprises a rigid member and an opposed pivotal member that is biased to clamp to a frame member of the shopping cart.

12. The child support carrier of claim 1, wherein the body has a bulk carrier for supporting bulk items.

13. The child support carrier of claim 12, wherein the bulk carrier is pivotable between stored and in-use positions.

14. The child support carrier of claim 1, further comprising a child seat in the space.

\* \* \* \* \*